Aug. 14, 1928.
L. HARVEY
QUICK RELINING BRAKE
Filed Sept. 8, 1927
1,680,611
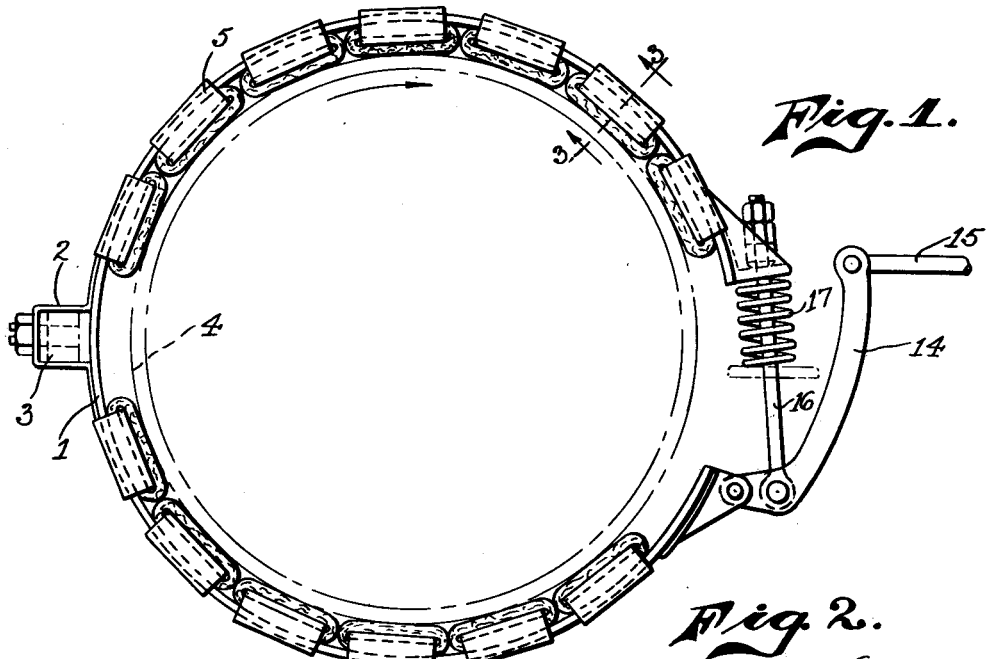
Fig. 1.
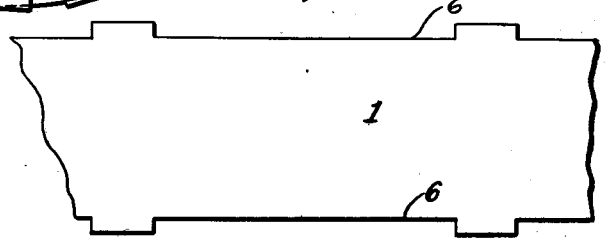
Fig. 2.
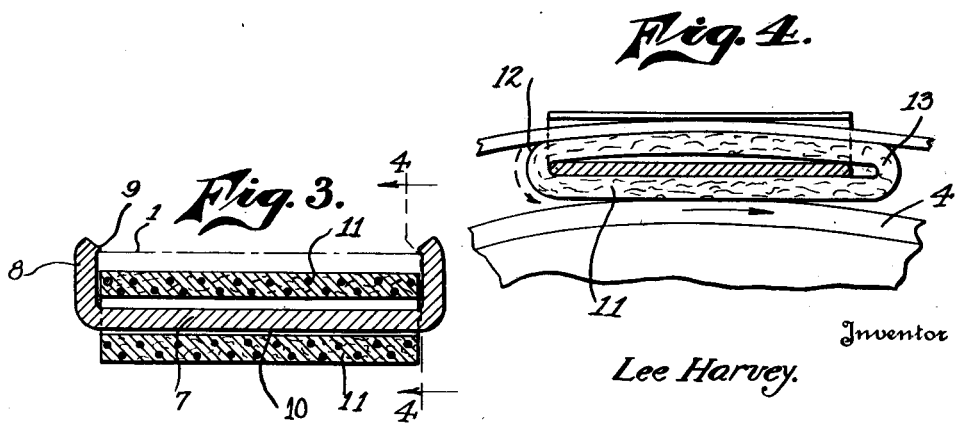
Inventor
Lee Harvey.
By Lyon & Lyon
Attorneys Patented Aug. 14, 1928.

1,680,611

UNITED STATES PATENT OFFICE.

LEE HARVEY, OF LOS ANGELES, CALIFORNIA.

QUICK-RELINING BRAKE.

Application filed September 8, 1927. Serial No. 218,148.

This invention relates to brakes, and while the invention is applicable to brakes used for any purpose whatever, the invention is expected to be especially useful when applied in the construction of the brakes of automobiles.

In automobile brakes it is the present practice to employ a brake-band which is applied to the outside or inner side of a brake-drum. These bands are lined with a wear strip which must be renewed from time to time. The wear is not evenly distributed throughout the length of the band, due principally to imperfect axial alinement between the band and the drum, and also to defects in the form of the drum; for example, where the drum is not truly cylindrical. Although the lining material is not expensive, automobilists are subjected to considerable inconvenience by loss of time and loss of the use of their cars or automobiles while the brakes are being relined.

The general object of this invention is to provide a construction for such a brake which will enable the lining to be renewed without delay, and in which the portions of the liner which are wearing faster than other portions may be renewed without necessitating the renewal of the entire lining of the brake.

A further object of the invention is to provide a brake with a liner which can be readily applied to the brake and also to construct the liner so that it automatically moves or creeps slightly so that it will operate to present its entire "outer" face to the face of the drum.

In the embodiment of the invention disclosed in the following specification, I contemplate employing a plurality of brake shoes, and one of the objects of the invention is to provide a simple construction for the shoes and brake band which will facilitate the detachment of any shoe to enable it to be relined and replaced without disturbing the other shoes on the band; also to provide a liner and shoe having correlated features of construction which will facilitate the quick application of the liner to the shoe and which will also enable the liner after the shoe is applied to the band, to creep slightly from constant use, so that all points on the outside of the liner present themselves in succession to the face of the drum. Although in the following specification I have described the brake as an "outside" type of brake, the invention may be as readily applied to the "inside" type of brake; in other words, the invention can be employed in the construction of a brake applied to the outside of the drum or the inside of the drum.

Further objects of the invention will appear hereinafter.

The invention consists of the novel parts and combination of parts to be described hereinafter, all of which contribute to produce an efficient quick relining brake.

A preferred embodiment of the invention is described in the following specification, while the broad scope of the invention is ponted out in the appended claims.

In the drawing:

Figure 1 is a side elevation of a brake embodying my invention, the same being of the outside type. This view illustrates a portion of the brake rod or link broken away.

Figure 2 is a developed plan showing a short portion of a brake band, the ends of the band being broken away. This view is upon an enlarged scale.

Figure 3 is a cross-section through the brake-band at one of the brake shoes, taken about on the line 3—3 of Figure 1 and upon an enlarged scale.

Figure 4 is a section through one of the shoes taken about on the line 4—4 of Figure 3 and showing a short portion of the brake band and indicating the position of the brake drum which is indicated broken away. This view particularly illustrates the manner in which the liner will operate to creep on the shoe so as to bring all of its area into action on the drum and thereby distribute the wear throughout the entire outer face of the liner.

Referring to the parts, 1 represents the brake-band which may be provided at one side with a bracket 2 to enable it to be attached to a support 3 adjacent the face of a brake-drum indicated by the dotted circle 4. This brake-band is constructed so as to carry a plurality of brake-shoes 5 and the band is constructed in such a way as to enable the shoe to make an interlocking connection with the band by a simple movement. The band is preferably in the form of a one-piece continuous strap of metal, and is so constructed that when the shoes have been placed on it, it will operate to prevent longitudinal movement of the brake shoe on the band which would otherwise occur due to the pull of the friction on the shoe. In the present instance the interlocking connection is provided by forming a plurality of integral shoulders by making notches 6 disposed on opposite sides of the band (see Figure 2). Each shoe is preferably constructed of a plate 7, the body of which extends transversely to the band, and the ends of the shoe are provided with simple means for enabling the same to attach itself to the band at the notches 6. In the present instance, this is accomplished by forming the shoe 7 with integral flanges 8 which project at right angles to the body of the shoe (see Figure 3) and the outer ends of these flanges are formed with inwardly projecting lips 9 (see Figure 3) which enable the shoes to be snapped over the band at the notches.

If desired, a simple liner consisting of a sheet of liner material may be applied to the inner face 10 of each shoe. However, I prefer to provide each shoe with an individual liner 11 which is formed of a short section of hose. This hose can be purchased on the market, and its wall is composed of layers of asbestos with reinforcing wire (see Figure 3). This short section of hose is applied to the shoe by slipping it over the end of the shoe and working it along until the liner envelops the body of the shoe (see Figure 3). When applied in this way the liner forms an endless band extending around the body of the shoe in the same direction in which the drum rotates, that is to say, the loops 12 and 13 of the liner are disposed the one behind the other with respect to the direction of rotation. With this organization of the parts, it will be evident that when friction is developed on the inner side of the liner the friction will tend to produce a slight creeping of the brake liner in the direction indicated by the dotted arrow in Figure 4.

This creeping, of course, will be very slight, and will not interfere with the effective operation of the liner. There simply would be a slight creeping movement when the brake is applied which would cease as soon as the regular mechanism braking pressure is developed to hold the shoe against the face of the drum.

Any suitable means may be employed for tightening the band on the brake drum. In the present instance I have illustrated the usual lever 14 connected to a brake rod 15 or link and including a drag stem 16 and spring 17 between the ends of the brake band. This spring, of course, opens up the brake band when the brake is not in operation.

It is understood that the embodiment of the invention described herein is only one of the many embodiments this invention may take, and I do not wish to be limited in the practice of the invention, nor in the claims, to the particular embodiment set forth.

What I claim is:

1. In a brake, the combination of a brake-band, a plurality of brake-shoes, said brake-shoes and said band having interlocking means enabling the shoes to be attached to the brake band by a substantially radial movement with respect to the central axis of the band, and an individual brake liner corresponding to each shoe and consisting of a section of an endless band, each shoe and each band being constructed so as to permit the liner to be slipped over the shoe.

2. In a brake, the combination of a brake-band, a plurality of brake-shoes, said brake-shoes and said band having interlocking means enabling the shoes to be attached to the brake band by a substantially radial movement with respect to the central axis of the band, each shoe being in the form of a plate extending transversely to the band and having integral flanges at the sides of the band operating to snap over the longitudinal edges of the band to retain the shoe on the band, and an individual brake liner carried by each shoe.

3. In a brake, the combination of a brake-band, a plurality of brake-shoes, said brake-shoes and said band having interlocking means enabling the shoes to be attached to the brake band by a substantially radial movement with respect to the central axis of the band, said interlocking means consisting of a pair of oppositely disposed notches in the side edges of the brake band and resilient catches carried by each shoe constructed to snap into the notches and retain the shoe on the band.

4. In a brake, the combination of a brake-band having a plurality of oppositely disposed notches in its side edges, brake shoes corresponding to the oppositely disposed notches, each brake shoe having a transverse plate extending across the band and having resilient means at its ends to snap over the edges of the band at said notches, and an individual brake liner carried by each shoe each brake liner consisting of an endless band, each liner cooperating with its shoe to enable the same to be slipped over the end of the shoe when applying the same to the shoe.

5. In a brake for the brake drum of an automobile, the combination of a plurality of brake-shoes, each brake-shoe having a liner in the form of an endless band supported on the shoe, with one loop of the band disposed behind the other loop with respect to the direction of rotation of the brake drum.

6. In a brake for the brake drum of an automobile, the combination of a plurality of brake-shoes, each brake-shoe having a liner in the form of an endless band supported on the shoe, with one loop of the band disposed behind the other loop with respect to the direction of rotation of the brake drum, said liners and said brake-shoes cooperating to permit a creeping movement of the liner on the shoe and thereby distributing the wear on the brake liner throughout its entire area.

7. In a brake, the combination of a brakeband in the form of a continuous one-piece strap of metal, a plurality of brake-shoes detachably mounted on said band, said band having means in the form of integral shoulders for holding the brake-shoes against longitudinal movement along the band when the brake is applied, and an individual liner corresponding to each shoe.

Signed at Los Angeles, California, this 27th day of August, 1927.

LEE HARVEY.